United States Patent [19]

Lafferty et al.

[11] 4,156,140

[45] May 22, 1979

[54] X-RAY IMAGING APPARATUS WITH CONTROL MESH

[75] Inventors: James M. Lafferty; Kei-Hsiung Yang, both of Schenectady, N.Y.

[73] Assignee: General Electric Company, Schenectady, N.Y.

[21] Appl. No.: 834,648

[22] Filed: Sep. 19, 1977

[51] Int. Cl.[2] .............................................. G03B 41/16

[52] U.S. Cl. ............................ 250/315 R; 250/315 A

[58] Field of Search ........................ 250/315 R, 315 A

[56] References Cited

U.S. PATENT DOCUMENTS

| | | | |
|---|---|---|---|
| 3,932,750 | 1/1976 | Reiss | 250/315 A |
| 3,969,624 | 7/1976 | Van Breson | 250/315 A |
| 4,039,830 | 8/1977 | Yang | 250/315 A |

*Primary Examiner*—Craig E. Church

*Attorney, Agent, or Firm*—Geoffrey H. Krauss; Joseph T. Cohen; Marvin Snyder

[57] ABSTRACT

Electrostatic x-ray imaging apparatus of the type having a gas-filled chamber bounded by a photocathode and a charge-receiving sheet anode has a control mesh positioned in the gas-filled gap and maintained at a positive voltage with respect to the cathode to facilitate high avalanche amplification and has a voltage between the mesh member and the anode chosen in the plateau region of the x-ray photocurrent versus voltage curve, to achieve a nearly constant efficiency of charge collection at the anode, independent of accumulation of charge thereat.

10 Claims, 2 Drawing Figures

X-RAY IMAGING APPARATUS WITH CONTROL MESH

BACKGROUND OF THE INVENTION

The present invention relates to x-ray imaging apparatus and, more particularly, to a novel electrostatic x-ray imaging apparatus having a control mesh for improving imaging contrast.

Apparatus for recording an x-ray image by electrostatic techniques, particularly in a device utilizing air-exposable recording film capable of rapid processing by xerographic techniques, is highly desirable to physicians and other x-ray technology users. Apparatus is known which fullfills these requirements, as disclosed in U.S. Pat. No. 3,940,620, issued Feb. 24, 1976, and in U.S. Pat. No. 4,039,830, issued Aug. 2, 1977, both assigned to the assignee of the present invention. U.S. Pat. No. 3,940,620 discloses an electrostatic x-ray image recording device having a gas-filled gap enclosed by a pair of spaced electrodes. A first electrode has a layer of fluorescent material, emitting ultraviolet photons responsive to receipt of x-ray quanta, and an overlayer of an air-exposable ultraviolet-sensitive photoemitting material. The remaining electrode has a plastic sheet positioned adjacent thereto and within the gas-filled gap. The photoemitting material emits electrons, responsive to incident ultraviolet photons from the fluorescent material layer, and the photons are accelerated across the gap responsive to an electric field therein. The accelerated electrons are amplified in the gas-filled gap by an avalanche effect and are deposited upon the the plastic sheet to form an electrostatic image, subsequently developed by xerographic techniques.

U.S. Pat. No. 4,039,830 discloses an electrostatic x-ray imaging recording device having a pair of spaced electrodes with a gas-filled gap therebetween and having a layer of a fluorscent phosphor material, emitting ultraviolet photons responsive to x-ray excitation, formed upon the gap-facing surface of one electrode and having a plastic sheet adjacent the gap-facing surface of the other electrode. A conductive mesh is positioned within the gas-filled gap and supports photocathodic material upon the mesh surface facing the phosphor layer on the first electrode. An x-ray quanta impinging directly upon the photocathodic material generate "fast" electrons which are generally directed away from the plastic sheet while "slow" electrons, generated in the photocathodic material responsive to ultraviolet photons produced in the phosphor layer, are emitted and caused to pass through the interstices of the mesh, by an electric field generated across the inter-electrode gap, and are subjected to acceleration and amplification within the gap prior to deposition upon the plastic sheet, for later development by xerographic techniques.

In the apparatus of either of the aforementioned Letters Patent, the avalanche amplification gain in the gas-filled gap depends upon the nature of the gas filling the gap and upon the amplitude of the field across the gap and hence the electric field in the gas-filled gap. The accumulation of the charges on the charge-receiving dielectric layer will decrease the electric field in the gas-filled gap. A decreasing field in the gap produces decreasing avalanche amplification and results in deposition of decreasing amounts of charge in the charge image, whereby relatively poor image contrast results. It is desirable to provide improved apparatus of the aforementioned types which assure that substantially constant avalanche amplification occurs during the entire image formation interval whereby the contrast of the charge image deposited upon the plastic sheet is improved.

BRIEF SUMMARY OF THE INVENTION

In accordance with the invention, an electrostatic x-ray image recording device of the type having a pair of spaced electrodes with a gas-filled gap therebetween and having means at and adjacent one of the electrodes receiving differentially absorbed x-rays for emitting differential patterns of photoelectrons, and having a plastic sheet positioned adjacent a remaining electrode for receiving the photoelectrons after avalanche amplification in a gas-filled gap between the electrodes, includes an uncoated metal mesh disposed between the plastic sheet and the elements of, and adjacent to, the electrode receiving the x-rays. The electric field to which the majority of amplification is attributable is of essentially constant magnitude, whereby substantially constant avalanche amplification and charge deposition occurs and a charge image of relatively high constrast is deposited upon the plastic sheet.

In a preferred embodiment, a nickel mesh is utilized with a strand thickness greater than about 15 microns to reduce distortion of the mesh responsive to force acting upon the mesh due to the surrounding electric field.

Accordingly, it is an object of the present invention to provide improved electrostatic x-ray imaging apparatus having a control mesh for improving the contrast of an image produced by the apparatus.

This and other objects of the present invention will become apparent upon consideration of the following detailed description taken in conjunction with the drawings.

DETAILED DESCRIPTION OF THE INVENTION

Figure 1:
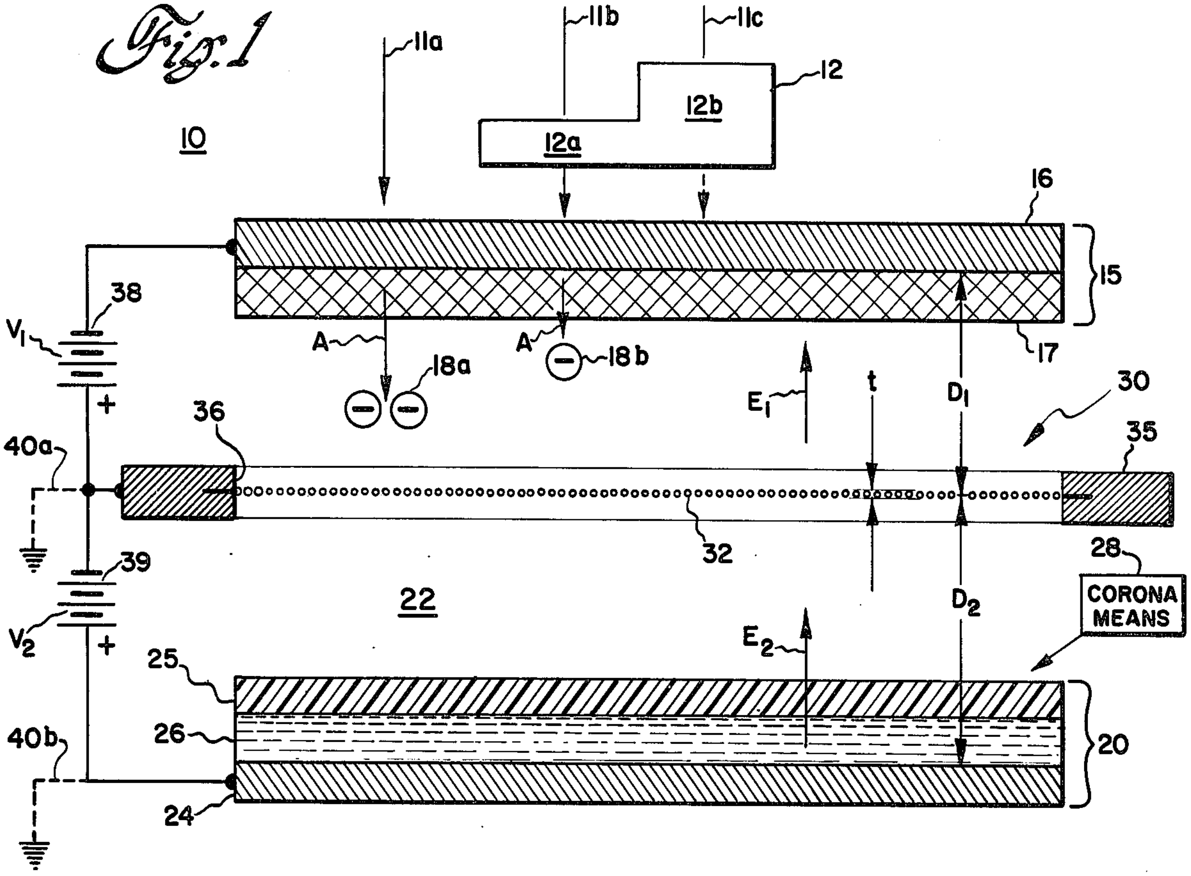
FIG. 1 is a sectional side view of an improved electrostatic x-ray imaging appratus having a control mesh, in accordance with the principals of the present invention.

Referring now to FIG. 1, improved electrostatic x-ray recording apparatus 10 receives a plurality of x-rays 11, from an x-ray source (not shown for purposes of simplicity), illuminating an object 12 to be analyzed. The x-rays, typically having energies in the region of 60 keV. for medical diagnostic use, are differentially absorbed in object 12 in accordance with the density and path length therethrough.

Accordingly, those x-rays **11*a* passing outside the boundaries of the object are essentially unabsorbed, whereas x-rays 11*b* transmitted through a relatively thin section 12*a* of the object are differentially absorbed to a lesser degree than other x-rays 11*c* transmitted through a relatively thick section 12*b*** of the object.

The differentially-absorbed x-rays are received at a first electrode 15 having a sheet 16 of a conductive material, such as a light metal, e.g. aluminum and the like, and supporting a layer 17 of a material, such as a phosphor and the like, characterized by emission of photoelectrons 18 responsive to absorption of x-ray photons. It should be understood that layer 17 may be a single layer of a material directly converting x-rays to photoelectrons; a first layer of a phosphor converting x-rays to ultraviolet photons, and overlayed with a second layer (furthest from conductive sheet 16) of a material converting the ultraviolet photons to phtoelectrons, as disclosed in the afore-mentioned U.S. Pat. No. 3,940,620, incorporated herein by reference; or a layer of a fluorescent phosphor material emitting ultraviolet photons responsive to x-ray excitation and having, spaced adjacent thereto, a mesh-based photocathode photoelectron discriminator means, as disclosed in the afore-mentioned U.S. Pat. No. 4,039,830 (incorporated herein by reference) for discriminating against "fast" electrons and allowing relatively "slow" electrons to be injected away from first electrode 15, in the direction of arrows A. It should be further understood that layer 17 may be a relatively flat, planar layer (as illustrated) or may be a structured photocathodic layer, as disclosed and claimed in pending application Ser. No. 759,426, filed Dec. 28, 1976 now U.S. Pat. No. 4,117,365, issued Sept. 26, 1978 and incorporated herein by reference.

A second electrode 20 is maintained in spaced-apart relationship from first electrode 15, by means (not shown), to form a gap 22 between the first and second electrodes. Second electrode 20 comprises another conductive sheet 24 having a sheet of plastic material, such as Mylar TM and the like, in abutment with the surface of sheet 24 facing first electrode 15. Advantageously, a layer 26 of a liquid, such as dodecane, is deposited between sheet 24 and plastic sheet 25 to provide smooth binding therebetween, to facilitate production of a relatively defect-free charge image upon plastic sheet 25, which image reduction is hereinbelow explained. Alternatively, the plastic sheet, or film, 25 may be charged by a positive corona means 28 to achieve smooth binding to planar conductive sheet 24, whereby liquid layer 26 is avoided.

Gap 22 is filled with an amplifying gas, such as air at atmospheric pressure (whereby a differential air pressure sealing means is not required to enclosed the volume defined between first electrode 15 and second electrode 20) or such as an argon-$CH_4$ mixture and the like, which gases will require a gas diffusion seal (not shown).

In accordance with the invention, a control means 30, comprised of a conductive fine mesh 32, is positioned within gap 22 at a distance $D_1$ from the conductive sheet 16 of the first electrode 15 and at a distance $D_2$ from the conductive sheet 24 of second electrode 20. Mesh 32 has a thickness t on the order of 15 microns and is, in a presently preferred embodiment, formed of a nickel mesh material having about 500 mesh lines per linear inch. A support member 35 of conductive material has an aperture 36 formed therethrough of size and shape similar to the desired imaging area; in our presently preferred embodiment, aperture 36 is circular, and support member 35 is an annular ring of conductive material. Mesh 32 is attached under tension at the aperture periphery and the control mesh assembly 30 is fixedly positioned and maintained with mesh 32 parallel to both electrodes 15 and 20 and spaced therefrom by distances $D_1$ and $D_2$, respectively.

A first source 38 of electrical potential $V_1$ is connected between conductive sheet 16, of first electrode 15, and conductive support 35 of the control mesh assembly. The positive terminal of potential source 38 is connected to the control mesh assembly to cause a first electric field of magnitude $E_1$ to be generated between the control mesh and first electrode conductive sheet 16, in the direction of arrow $E_1$. A second source 39 of electrical potential, of magnitude $V_2$, is connected between control mesh assembly 30 and second electrode conductive sheet 24, with the positive terminal of source 39 being coupled to the second electrode to generate a second electric field of magnitude $E_2$, between second electrode conductive sheet 24 and mesh 32, in the direction of arrow $E_2$.

In operation, voltages $V_1$ and $V_2$ are connected between first electrode 15 (cathode) and mesh assembly 30 and between mesh assembly 30 and second electrode 20 (anode) during x-ray exposure of object 12. The differentially-absorbed x-rays 11 produce proportionate emission of photoelectrons 18. Thus, x-ray photons, **11*a*, having undergone substantially no absorption of object 12, produce a relatively large number of photoelectrons 18*a*, while x-ray photons 11*b*, having undergone a certain amount of attenuation during passage through object portion 12*a*, cause emission of a lesser number of photoelectrons 18*b*, and x-ray photons 11*c*, assumed to be completely attenuated by the relatively thick object portion 12*b*, do not cause emission of any photoelectrons. Photoelectrons 18 are accelerated across the gas gap, by action of first electric field $E_1$, toward mesh 32 and undergo avalanche amplification within the gas. As the thickness (or diameter) of each mesh strand (about 15 microns) is very much less than the spacing between adjacent strands (about 1/500 inch), part of the amplified electron stream, accelerated by interaction with first electric field $E_1$, passes through the interstices of mesh 32 toward second electrode 20 and a charge image of object 12 is deposited upon insulative plastic sheet 25, for subsequent development by known xerographic techniques. The magnitude of the photoelectron current, responsive to x-ray reception, is a function of the field acting upon the photoelectrons. The magnitude $V_2$ of potential source 39, and hence the magnitude $E_2$ of the field between second electrode 20 and mesh 32, is chosen to cause operation in the so-called "plateau" region of the x-ray photocurrent vs. electric field curve. Thus, if voltage $V_2$ is chosen near the upper end of the plateau region, the photoelectrons passing through the mesh are further accelerated toward second electrode 20 and undergo additional amplification in the gas-filled gap, prior to deposition upon insulating sheet 25. As the amount of negative charge deposited upon sheet 25 increases, the magnitude of potential between second electrode 20 and mesh 32 decreases, with proportional decrease in the magnitude of accelerating field $E_2$. However, the lower magnitude of second electric field $E_2$ produces a relatively small change in x-ray induced photoelectron current, as the avalanche amplification process in the gap between mesh 32 and second electrode 20 is still operational on the "plateau" region of the curve, whereby photoelectron current is maintained substantially constant even as increasing values of negative charge on sheet 25 reduce the magnitude of second electric field $E_2$. Thus, a nearly constant efficiency of charge collection on insulating sheet 25** is achieved independent of the reduction in field between the second electrode and the mesh, caused by accumulation of charge on the insulating foam during x-ray exposure.

Figure 2:
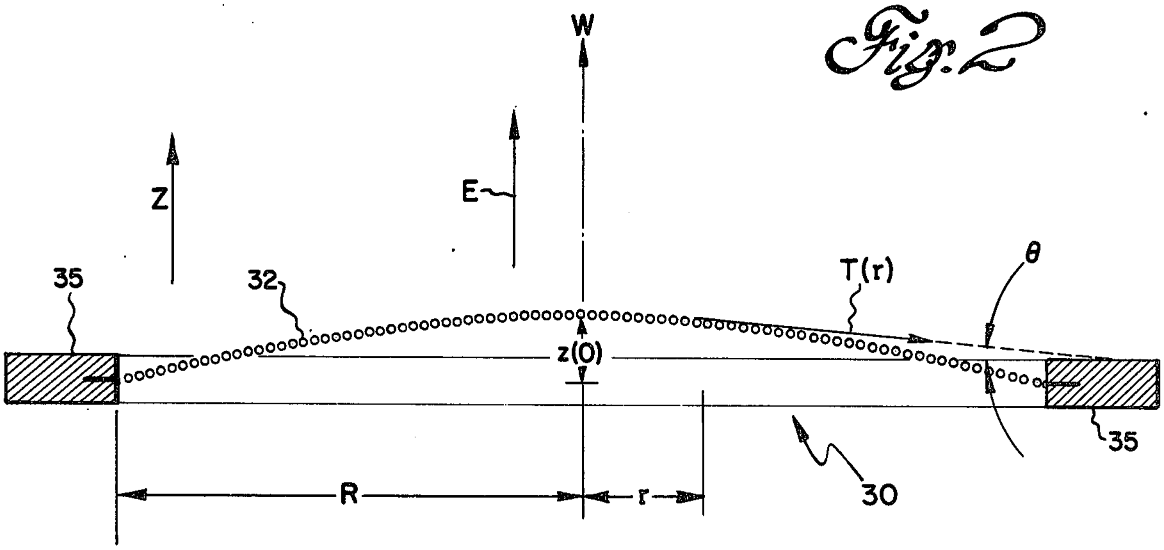
FIG. 2 is a sectional side view of the control mesh, illustrating the distortion of the mesh responsive to the surrounding electric field.

Referring now to FIG. 2, the relatively strong net electric field E (equal to $E_1$31 $E_2$) acts upon the fine strands of mesh 32 to generate a force per unit area W, in the direction Z toward first electrode 15, which force tends to distort the mesh and cause a variation of avalanche amplification gain within the gas gap distance $D_1$ between first electrode 15 and the mesh. Thus, force $W=(\frac{1}{2})K\epsilon_0|E|^2$, where K is the dielectric constant of the gap, $\epsilon_0$ is permittivity of vacuum, and E is the net electric field $(E_1-E_2)$. The displacement z(r) in the direction Z, of a mesh strand at a radial distance r from the center of the mesh circle of radius R, is given by the equation $$z(r)=(c/W)(\cos h(WR/c)-\cos h(Wr/c))$$

where c is given in units of force per unit length and is defined by $$T(r)=c \cos h(Wr/c)=c/\cos\theta$$

where T(r) is the tension on a mesh strand at position r, and $\theta$ is the angle between the tension vector (which is tangent to the distortion curve of the mesh at strand r) and the plane of the undistorted mesh, parallel to both flat electrodes 15 and 20. Thus, the strands of mesh 32 undergo increasing distortion towards first electrode 15, from their desired planar position, as the center of the mesh is approached; the effective distance between the mesh and the facing surface of conductive sheet 16 is thus changed and the avalanche amplification gain is varied within the gas gap between the mesh and the first electrode.

In a presently preferred embodiment, wherein a tightened nickel mesh 32 is utilized, the value of c attainable with negligible mesh distortion and elongation, is given by $$c=(0.1)YtP$$

where Y is Young's modulus for the mesh material and P is the percentage of opacity of the mesh. Utilizing a nickel mesh with 1500 lines per inch and with a value P=0.64 and t=3.75 microns and a Young's modulus $Y=2.1\times10^{12}$ dynes/cm.$^2$; an air-filled gap 22 with K=1.0; and potential sources 38 and 39 of magnitude to yield a net electric field (at the mesh) of magnitude $E=1.6\times10^4$ volts per centimeter, we find the maximum distortion distance z(0), at the center of a circular mesh, to be approximately 1.8 microns for a mesh with radius R of 5 inches and a distortion distance of about 18.6 microns for a mesh with radius R of about 16 inches. In the presently preferred embodiment, the nickle mesh has a strand thickness greater than 15 microns, which thickness is sufficient to reduce the maximum distortion displacement to a negligible value. It should be understood that for a mesh 32 formed of a different material, the strand thickness required for negligible maximum distortion displacement will be different due to the different value of Young's modulus for that material, but the required strand thickness may be found by resort to the above analysis. It should be further understood that, while separation distances $D_1$ and $D_2$ are respectively one millimeter and 0.5 millimeters in a presently preferred embodiment, other distances can be utilized. It should also be understood that either of mesh assembly 30 or second electrode conductive sheet 24 may be operated at ground potential, as indicated by the electrical ground potentials 40_a_ and 40_b_ (shown in broken line) connected thereto, or that both the control mesh assembly and the second electrode conductive plate may be connected to electrical ground potential and second potential source 39 removed, especially if plastic sheet 25 is smoothly bound to second electrode conductive sheet 24 by positive corona means, with the positive charge on the sheet supplying a second electric field of sufficient magnitude 82 for proper apparatus operation.

While the present invention has been described with reference to a presently preferred embodiment thereof, many variations and modifications will now become apparent to those skilled in the art. It is our intent, therefore, to be limited solely by the scope of the appending claims and not by the description of a preferred embodiment.

What is claimed is:

1. In electrostatic x-ray imaging apparatus of the type having a gas-filled chamber bounded by a photocathode receiving differentially-absorbed x-radiation and a charge-receiving sheet anode spaced from said photocathode, the improvement comprising:

a single conductive and uncoated control mesh positioned as the only electrode in the gas-filled gap between, but not in contact with, said photocathode, said mesh having a spacing between adjacent mesh strands thereof greater than the thickness of each mesh strand;

means for maintaining said control mesh at a positive potential with respect to said photocathode to facilitate avalanche amplification of photoelectrons passing through said gas-filled gap from said photocathode to said control mesh; and means for maintaining said charge-receiving sheet anode at a potential with respect to said control mesh to facilitate operation in the plateau region of an x-ray photocurrent versus voltage curve of said apparatus.

2. The improved x-ray imaging apparatus of claim 1, wherein said single control mesh has a thickness sufficient to substantially eliminate distortion thereof responsive to forces acting upon the mesh due to the surrounding electric field.

3. The improved apparatus of claim 2, wherein said mesh is formed of nickel.

4. The improved apparatus of claim 3, wherein the strands of said nickel mesh have a thickness greater than about 15 microns.

5. The improved apparatus of claim 2, wherein said control mesh has about 500 mesh strands per linear inch.

6. The improved apparatus of claim 1, further comprising means supporting the periphery of said control mesh for maintaining said control mesh under tension.

7. The improved apparatus of claim 6, wherein said supporting means is a support member formed of conductive material and having an aperture formed therethrough for containing said mesh.

8. The improved apparatus as set forth in claim 1, wherein said control mesh is positioned approximately twice as far from said photocathode as from said anode.

9. The improved apparatus as set forth in claim 1, wherein said control mesh is separated from said photocathode by a distance of about 1 millimeter.

10. The improved apparatus of claim 9, wherein said control mesh is spaced a distance of about 0.5 millimeters from said anode.

* * * * *